United States Patent
Jänicke

(10) Patent No.: US 8,897,408 B2
(45) Date of Patent: Nov. 25, 2014

(54) METHOD FOR OPERATING AN AUTOMATION SYSTEM

(75) Inventor: Peter Jänicke, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/481,037

(22) Filed: May 25, 2012

(65) Prior Publication Data

US 2013/0136197 A1    May 30, 2013

(30) Foreign Application Priority Data

May 26, 2011    (EP) .................................... 11167589

(51) Int. Cl.
*H04L 7/00*    (2006.01)
*H04L 7/04*    (2006.01)
*G05B 19/042*    (2006.01)

(52) U.S. Cl.
CPC .............. *H04L 7/04* (2013.01); *G05B 19/0421* (2013.01); *G05B 2219/25483* (2013.01); *G05B 2219/25479* (2013.01)
USPC ........... 375/354; 375/259; 375/357; 375/369; 375/372; 375/373; 370/395.62; 370/507; 370/473; 455/265

(58) Field of Classification Search
CPC ..... H04J 3/0664; H04J 3/0673; G05B 19/054
USPC ......... 375/354, 259, 357, 369, 372, 373, 374; 395/550; 370/473, 395.62, 507; 455/265; 702/89; 713/375, 400
See application file for complete search history.

(56) References Cited

U.S. PATENT DOCUMENTS

| | | | |
|---|---|---|---|
| 5,566,180 A * | 10/1996 | Eidson et al. ................. | 370/473 |
| 6,909,255 B2 | 6/2005 | Jänicke | |
| 6,999,326 B2 | 2/2006 | Jänicke | |
| 7,415,072 B2 | 8/2008 | Jänicke | |
| 7,860,205 B1 * | 12/2010 | Aweya et al. ................. | 375/376 |
| 2003/0014679 A1 * | 1/2003 | Domon ......................... | 713/400 |
| 2004/0258097 A1 | 12/2004 | Arnold et al. | |
| 2006/0129864 A1 * | 6/2006 | Kynast et al. ................. | 713/375 |
| 2007/0104228 A1 * | 5/2007 | Cohen et al. .................. | 370/518 |

FOREIGN PATENT DOCUMENTS

| | | |
|---|---|---|
| DE | 101 13 261 A1 | 9/2002 |
| EP | 991216 A2 * | 4/2000 |
| EP | 2 169 487 A1 | 3/2010 |
| WO | WO 03/028258 A1 | 4/2003 |
| WO | WO 03 028259 A1 | 4/2003 |

\* cited by examiner

*Primary Examiner* — Sam K Ahn
*Assistant Examiner* — Fabricio R Murillo Garcia
(74) *Attorney, Agent, or Firm* — Henry M. Feiereisen LLC

(57) ABSTRACT

A method for operating an automation system with a plurality of communication users linked for communication purposes via a serial connection, of which at least one functions as sender and at least one as a receiver, includes determining at a sender an offset value between an occurrence of a synchronous signal and a communication clock cycle, transmitting the determined offset value in a data transmission to the at least one receiver, waiting at the at least one receiver until a time period commensurate with the offset value has elapsed, and generating at the at least one receiver an output signal after the time period has elapsed.

12 Claims, 4 Drawing Sheets

FIG 6
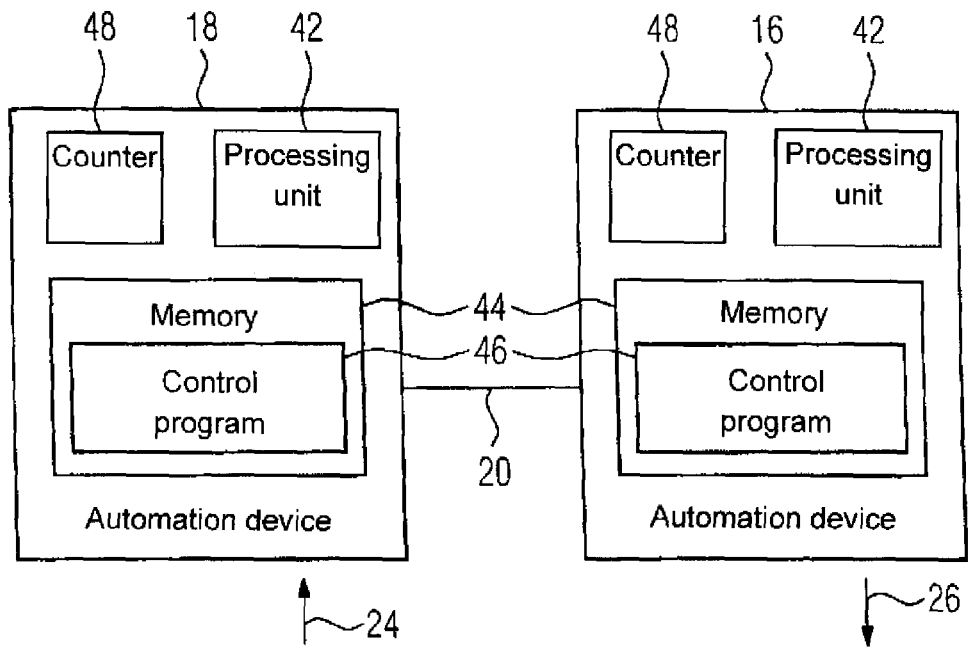
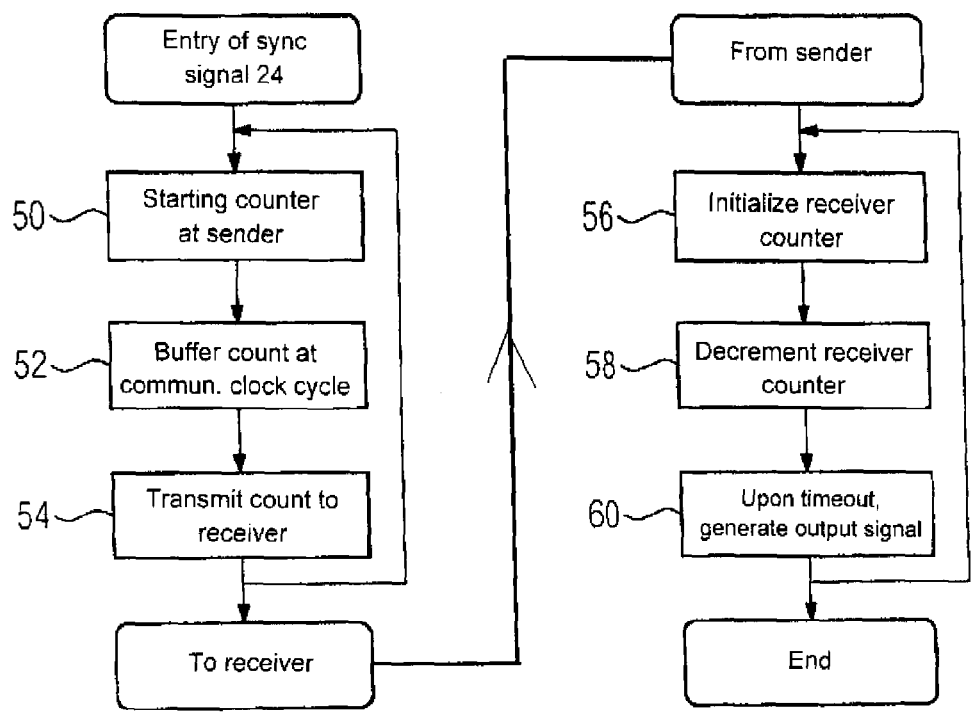

METHOD FOR OPERATING AN AUTOMATION SYSTEM

CROSS-REFERENCES TO RELATED APPLICATIONS

This application claims the priority of European Patent Application 11167589.8, filed May 26, 2011, pursuant to 35 U.S.C. 119(a)-(d), the content of which is incorporated herein by reference in its entirety as when fully set forth herein.

BACKGROUND OF THE INVENTION

The present invention relates to a method for operating an automation system with a plurality of communication users connected for communication purposes via a serial link.

The following discussion of related art is provided to assist the reader in understanding the advantages of the invention, and is not to be construed as an admission that this related art is prior art to this invention.

In an automation system which is normally operated as a real-time system, with a plurality of modules functioning as communication users in the communication system, there is the need to synchronize these communication users in order to make simultaneous working possible. When the communication users are not supplied with a system-wide clock, as is expedient and normal for greater distances, a jitter inevitably arises which is of the order of magnitude of one clock period, with which the communication users are each clocked internally and a synchronization signal is produced by the synchronization.

Automation systems of the aforedescribed type and methods for their operation are known in the art. The disadvantage, however, in a serial transmission of a synchronization signal is the inevitable jitter which additionally arises during said transmission. This occurs through the serial protocol not usually being able to be sent at just any time. The reasons for this can be that the synchronous signal can only be sent and thereby the receiver or each receiver can only be notified when a data transmission in progress is completed. Furthermore, the baud rate of the transmission is low compared to the respective module clock even when it is expediently formed by a fixed divisor from the respective module clock. Finally, the signal is transmitted by data symbols which, although they are likewise formed by a fixed divisor from the system clock, overall let the duration of the data transmission compared to the respective module clock be of a comparatively long duration.

It would therefore be desirable and advantageous to obviate prior art shortcomings and to provide an improved method for operating an automation system in which, for transmitting a synchronous signal between communication users included in the automation system, of which at least one communication user functions as a sender and at least one other communication user functions as a receiver, to avoid the above disadvantages or at least to reduce their effects.

SUMMARY OF THE INVENTION

According to one aspect of the present invention, a method for operating an automation system with a plurality of communication users linked for communication purposes via a serial connection, of which at least one functions as sender and at least one as a receiver, includes the steps of determining at a sender an offset value between an occurrence of a synchronous signal and a communication clock cycle, transmitting the determined offset value in a data transmission to the at least one receiver, waiting at the at least one receiver until a time period commensurate with the offset value has elapsed, and generating at the at least one receiver an output signal after the time period has elapsed.

The advantage of the invention is primarily that, by determining an offset value between the occurrence of the synchronous signal and the communication clock cycle in respect of the temporal resolution of the notification of the synchronous signal to the receiver or to each receiver, a reduction of the communication clock cycle is possible. The communication clock cycle is thus divided up in a fine granular manner and in relation to the communication clock cycle on the receiver side, by waiting for a period of time corresponding to an offset determined on the sender side, the same reduction of the communication clock cycle and a corresponding fine granular resolution is achieved. The jitter arising through the serial transmission and previously unavoidable is thus eliminated.

According to an advantageous feature of the present invention, a value of a counter started with the synchronous signal is used as a offset value between the occurrence of the synchronous signal and the communication clock cycle. The offset or the offset value is then the count at the next communication clock cycle. Alternatively, the counter may be started at each communication clock cycle and the offset or offset value may be transmitted as the count on occurrence of the synchronous signal. A counter is a simple functional unit which can be readily implemented in software or in hardware. The count can readily be used as a measure for an offset between an occurrence of the synchronous signal and the communication clock cycle.

When the value of the counter, i.e. the start value of the counter for a decrementing counter or the maximum value of the counter for an incrementing counter for example, is selected large enough in relation to a communication clock cycle for the counter not to time out in any event during a communication clock cycle, the complete communication clock cycle can be resolved in a One granular manner in respect of the point at which the synchronization signal occurs.

According to an advantageous feature of the present invention, the counter started with the synchronous signal may be decremented or incremented with the occurrence of a device clock pulse. Advantageously, the counter may also be started with each communication clock cycle and for example incremented. Basically however it is of no significance whether an incrementing or a decrementing counter is used. What is of significance is that a measure for a time offset is picked up with the counter. This is just as possible with a decrementing counter as with an incrementing counter. The measure for the time offset is produced especially exactly when the counter is clocked with an equidistant signal. The device clock pulse of the respective automation device is suitable for this. The device clock pulse is the clock of the respective communication user that has received the synchronous signal and notifies other communication users of the synchronous signal, i.e. the communication user functioning as the sender in relation to the synchronous signal.

According to an advantageous feature of the present invention, when the receiver or each receiver, in order to wait for a period of time of a timer corresponding to the determined offset to elapse, loads a time with the determined offset and on expiry of the time generates the output signal, simple conditions are also produced on the receiver side. Specifically when a timer for determining the offset between the occurrence of the synchronous signal and the communication clock cycle is used on the sender side, the determined offset for the data transmission can be transmitted directly to the receiver or each receiver. The receiver or each receiver receives as the determined offset the count of the counter of the sender. Each receiver loads their counter with the received offset and generates an output signal when the counter times out.

The counter on the receiver side may advantageously be decremented with each occurrence of a receiver-side device clock pulse, i.e. a device clock pulse of the communication user or each communication user functioning as receiver in each case.

According to an advantageous feature of the present invention, a plurality of uncorrelated signals or synchronous signals may be transmitted. This represents a particular challenge for serial links, because the signals can arrive with short time intervals between them, but serial transmission, because of the respective baud rate and the data symbols to be used, takes a comparatively long time however.

According to another advantageous feature of the present invention, a counter to which the sender-side device clock pulse has been applied, especially a counter decremented with the sender-side device clock pulse, is started with each of a first and a second (synchronous) signal; the first counter is stopped with the communication clock cycle for a first data transmission associated with the first (synchronous) signal; the count of the first counter is transmitted in the first data transmission; the second counter is stopped with the communication clock cycle upon conclusion of the first data transmission for a second data transmission associated with the second (synchronous) signal, and a count of the second counter is transmitted in the second data transmission.

According to an advantageous feature of the present invention, for transmission of a plurality of signals or synchronous signals, the value of the first and second counter in relation to a communication clock cycle may be selected to be sufficiently large so as not to time out during a predetermined plurality of communication clock cycles. The size of the counter and the predetermined plurality of communication clock cycles are determined in this case according to the communication clock cycle and the expected duration at least of the first data transmission. When it is assumed that during a first data transmission not only a second but also a third and possibly further (synchronous) signals arrive, the counters should be selected large enough for no expiry to be produced until the last data transmission begins.

According to another aspect of the invention, an automation device may be used as a communication user in an automation system of the aforedescribed type which operates in accordance with the aforedescribed method and includes means for executing the method. The method of the invention may advantageously be implemented in software.

The invention is also directed to a computer program with program code instructions executed on a computer and to a storage medium with a stored computer program as well as to an automation device having memory and a processing unit for executing the computer program with the program code instructions.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 shows a diagram with the configuration of the automation devices involved for executing the method as well as a flowchart illustrating the method steps at the sender-side and receiver-side when using the method according to the present invention.

DETAILED DESCRIPTION OF PREFERRED EMBODIMENTS

Figure 1:
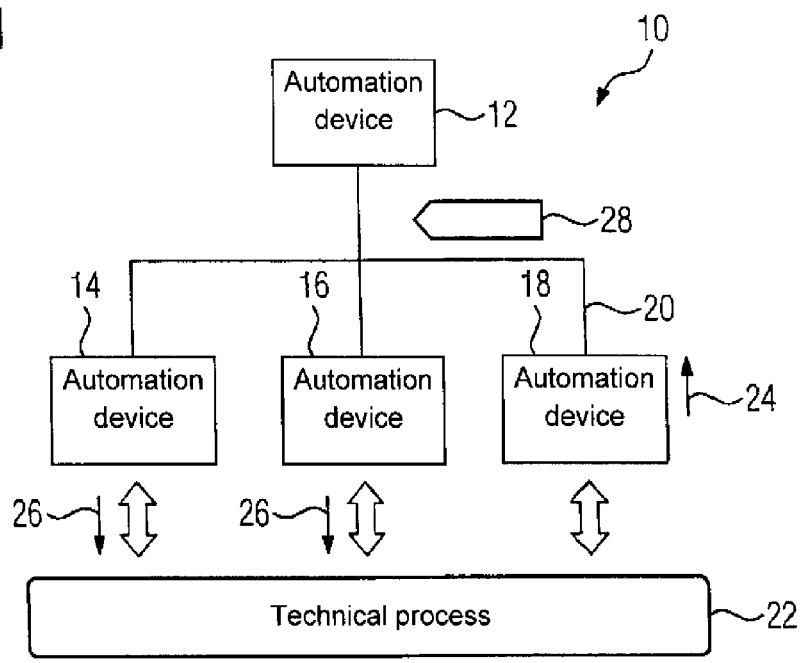
FIG. 1 shows an automation system with automation devices connected for communication by a serial link for control and or monitoring of a technical process.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified diagram of an automation system 10 with a plurality of automation devices 12, 14, 16, 18 connected for communication. Because of the communication link existing between the automation devices 12-18 these devices are also referred to here and below has communication users and each automation device can function, depending on the communication relationship, both as sender and also as receiver.

The term automation device includes all devices, equipment or systems, i.e. as well as controllers such as programmable logic controllers, process computers, (industrial) computers and the like, also drive controllers, frequency converters and similar, as are used or are able to be used for open-loop control, closed-loop control and/or monitoring of technological processes, for example for conversion or transporting of material, energy or information, etc.

To connect together the automation devices/communication users 12-18 for communication a serial link 20 for serial data transmission is provided, for example a serial bus. Overall the automation system 10 is provided for control and/or monitoring of a technical process 22 not presented in any greater detail. In this case data is accepted from a process 22 in a known manner and processed in the automation system 10. The automation system 10, as a result of such data and internal processing passes control signals to the technical process 22. The receiving of data from the process 22 and the output of data to the process 22 is undertaken in such cases at least essentially under real-time conditions, in order for example to make digital closed-loop control possible. For this it is necessary for example for a plurality of communication users to react simultaneously or essentially simultaneously or for communication users to react to a periodic signal with the same periodicity. A signal from the technical process 22 or from the automation system which demands such treatment is referred to below as a synchronous signal. With such a synchronous signal for example the simultaneous control of a plurality of units in the technical process 22 can be initiated even when control signals relating to said units are entered from different automation devices 12-18 into the technical process 22.

FIG. 1 shows, simply by way of example, a synchronous signal 24 generated periodically by an automation device 18. All other automation devices 14, 16 synchronize themselves to this synchronous signal 24 and in this way can initiate temporally-correlated actions. In the example assumed in the diagram output signals 26 are issued by two other automation devices 14, 16 to the technical process 22, for example to activate or deactivate units such as motors, valves or the like. To notify the other automation devices 14, 16 about the synchronous signal 24 and thus make it possible for these devices to synchronously generate the respective output signal 26, that automation device 18 which has received the synchronous signal 24 sends a telegram to the automation device or each automation device 14, 16 involved as information at least about the arrival of the synchronous signal 24.

Figure 2:
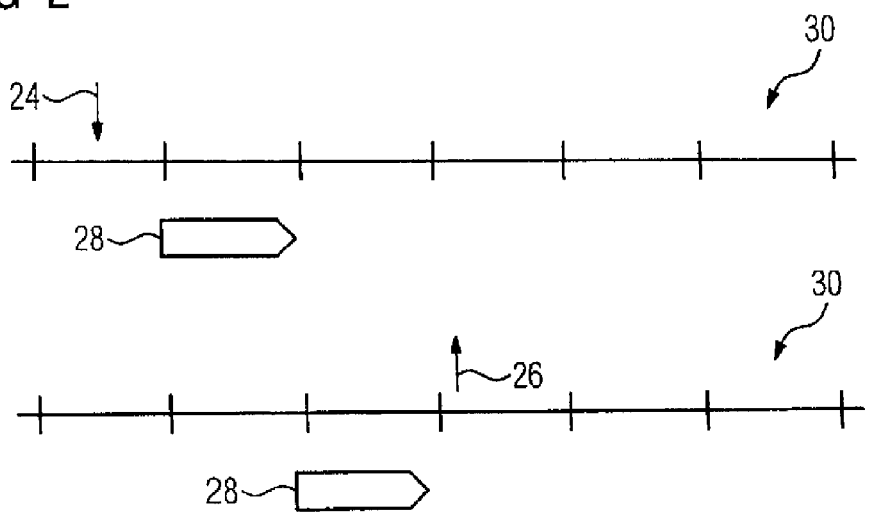
FIG. 2 shows a time sequence of actions in response to receiving a synchronous signal at an automation device and its notification to other automation devices.

FIG. 2 also shows—likewise only in a simplified schematic form—over the period of a communication clock cycle 30, first of all the arrival of the synchronous signal 24 on the receiver side and the telegram 28 sent because of the synchronous signal. The telegram 28 cannot be sent at just any times, but only when an ongoing data transmission is concluded and in any event dependent on the communication clock cycle. The telegram 28 (lower communication time line) is received by an automation device 12-18 functioning as a receiver and the receipt of the telegram 28 makes it possible for said receiver to generate the output signal 26 as a reaction to the synchronous signal. It is evident here that the communication clock cycle defines the temporal resolution with which there can be a reaction to a synchronous signal: For a synchronous signal 24 arriving between two communication clock cycles a telegram 28 can in any event be issued at the earliest in the immediately following communication clock cycle, in order to notify other communication users about the entry of the synchronous signal 24. On the receiver side the synchronous signal 24 then appears to have arrived synchronously with the communication clock cycle, which is actually not the case. The error arising as a result is referred to as jitter. Different approaches to resolving this problem have been taken previously: On the one hand the serial transmission of the synchronous signal 24 has been dispensed with altogether and in such cases the additional communication line needed has been taken into consideration. On the other hand, for a serial transmission of the synchronous signal, the jitter has also just been accepted, which however is not possible with high demands on the synchronicity. Finally there is also the possibility of reducing the jitter in a serial transmission of the synchronous signal with a phase locked loop (PLL). However the additional outlay is disadvantageous and also the fact that PLLs only reduce the jitter but cannot avoid it.

The approach in accordance with the invention uses a time measurement on the sender side in order to determine an offset between the occurrence of the synchronous signal 24 and the beginning of the next possible communication clock cycle for transmitting a telegram 28. The offset determined in this way is transmitted in the serial data stream, i.e. for example as an item of payload data in a telegram 28 and is used on the receiver side to compensate for the jitter by inserting a delay.

Figure 3:
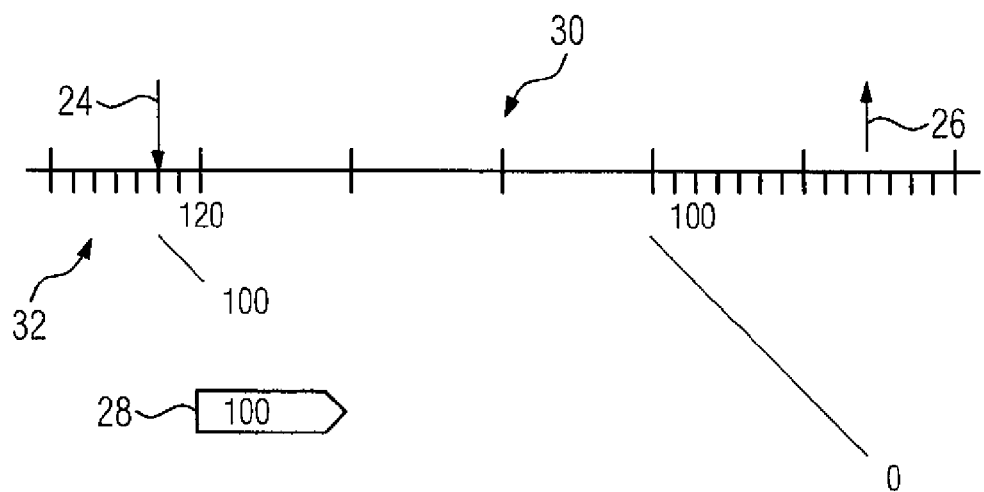
FIG. 3 shows an illustration of the time sequence of actions illustrated in FIG. 2 in accordance with the present invention.

FIG. 3 shows a simplified diagram of the approach in accordance with the invention. At a specific point in time a synchronous signal 24 arrives at an automation device 12-18 (FIG. 1). The respective automation device 12-18 also functions as a sender and has to notify the arrival of the synchronous signal 24 to at least one further automation device 12-18 (receiver). The left-hand side of the diagram in FIG. 3 illustrates the circumstances on the sender side and the right-hand side of the diagram illustrates corresponding circumstances on the receiver side or on the side of one of the receivers. The figure shows that on the sender side a measure for an offset between an occurrence of the synchronous signal 24 and the communication clock cycle 30 is determined. A value of a counter started with the synchronous signal 24 is used here as a offset value between the occurrence of the synchronous signal 24 and the communication clock cycle 30. The numerical value "120" is used in the figure as a label for the start value of such a counter. The sender side counter is initialized with this start value on arrival at the synchronous signal 24. Thereafter the value of the counter is reduced (decremented) at regular intervals. A device clock pulse 32 comes into consideration for this purpose, i.e. a clock of a clocked generator which the respective automation device 12-18 normally includes in any event, for example for clocking its microprocessor or the like. To determine the offset values between the occurrence of the synchronous signal 24 and the communication clock cycle 30, the count of the counter is quasi frozen at the next communication clock cycle 30, in that the decrementation is ended or the count is saved in a buffer. To this end the numerical value "100" shows a typical value for the count at this point in time (the diagram assumes in a greatly simplified manner that each tenth device clock pulse 32 is symbolized on the time axis by a stroke, so that from the arrival of the synchronous signal 24 to the next communication clock cycle 30 the counter is decremented with two times ten device clock pulses). This count is an example for a offset value between the occurrence of the synchronous signal 24 and the communication clock cycle 30. The text below, without foregoing further general applicability, uses the abbreviated term offset and no longer refers to offset value. The offset is then transmitted during a data transmission to the receiver or each receiver. For this purpose a telegram 28 is shown to symbolize the data transmission, which as its payload data comprises at least the determined offset (shown by the numerical value "100" in the telegram 28). The receiver waits to receive the telegram and the information included therein in respect of the offset between arrival of the synchronous signal 24 and the communication clock cycle 30 for a period of time corresponding to the offset and, after this period of time has elapsed, generates the output signal 26. For this purpose, in the embodiment shown schematically, a counter is also provided on the receiver side (right-hand side of the diagram in FIG. 3) which, in conjunction with the receipt of the telegram, is initialized with the value of the offset thus received (shown by the numerical value "100"). Waiting for the said period of time occurs on the receiver side by the counter, starting from the respective start value, being decremented with the receiver-side device clock pulse. When the counter has timed out (counter value "0"), the receiver generates the output signal 26.

It can now be generally recognized from the depiction in FIG. 3 that the communication clock cycle 30 is resolved with fine granularity and even when the notification of the arrival of a synchronous signal at a receiver continues—as a result of the transmission in a protocol—and thus communication clock cycle-linked telegram 28—to occur in each case only at the beginning of the communication clock cycle 30, the time of the actual arrival of the synchronous signal is taken into account on the sender side and notified to the receiver. The generation of the output signal 26 as a reaction to the notification of the synchronous signal 24 is thus independent of the communication clock cycle 30.

Figure 4:
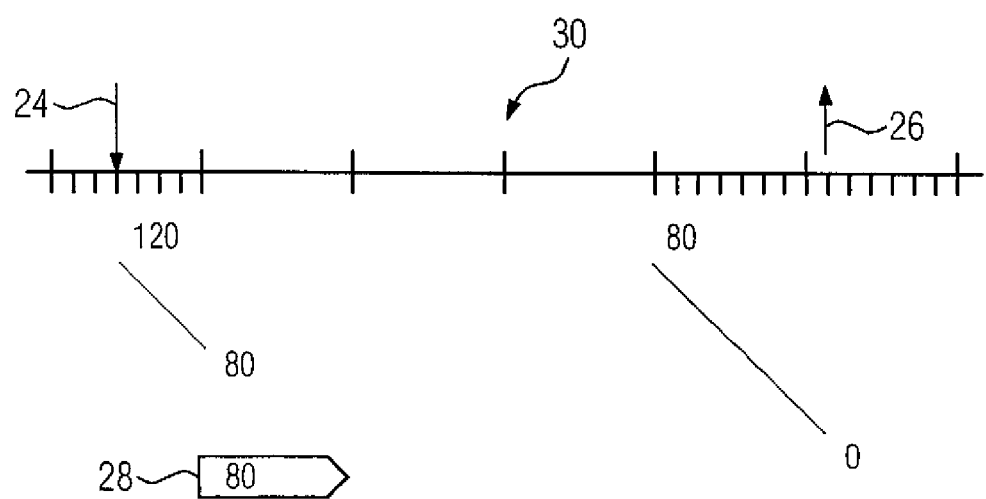
FIG. 4 shows a diagram according to FIG. 3 to illustrate maintaining timing relationships in relation to the time when a synchronous signal is received.

For further illustration, FIG. 4 shows a similar situation to FIG. 3 and for the purposes of illustration it can be assumed that FIG. 4 presents a situation in the automation system 10 at a later point in time than the situation shown in FIG. 3. In any event a synchronous signal 24 again arrives and the offset between this arrival and the communication clock cycle 30 is recorded via the counter ("unlatched"). Relative to the communication clock cycle 30, the synchronization signal arrives earlier in the situation shown in FIG. 4, so that the counter also continues to run, down to the counter value "80" in this case. This counter value is determined as the offset at the receiver and by initialization of the counter with this offset and subsequent decrementing of the receiver is delayed for a period of time corresponding to the offset until the output signal 26 is generated. On the basis of the time for generating the output signal 26 relative to the communication clock cycle 30, it is detected that the output signal 26 in FIG. 4 is actually generated earlier by precisely the same amount as the synchronous signal 24 has arrived by comparison to the situation in FIG. 3. In addition to the fine granular resolution of the communication clock cycle 30—which is stepped down from the communication clock cycle 30—a relationship between consecutive occurrences of a plurality of synchronous signals 24 is maintained.

In the illustrated embodiment, it is assumed that the value of the counter in relation to a communication clock cycle is selected to be sufficiently large so that the counter never times out during a communication clock cycle 30. This makes it possible to resolve the complete duration of a communication clock cycle 30 with the granularity/step-down mentioned above.

The offset can also be determined on the sender side by a counter with the communication clock cycle being started, and being frozen with the arrival of the synchronous signal. In accordance with the circumstances assumed above for explanation of the diagram in FIG. 3 a counter incrementing from zero would have reached a value of 50. On the receiver side there would then be a counter with the value 50 to be loaded and decremented. At zero the signal is output. An alternative also to be considered is to start a counter on the receiver side with each communication clock cycle or with predetermined or predeterminable communication clock cycles and compare the count continuously with the value transmitted as the offset. As soon as the count of the counter has reached the value for the offset the period for which the receiver side has to wait has elapsed. The output signal 26 can then be generated.

Figure 5:
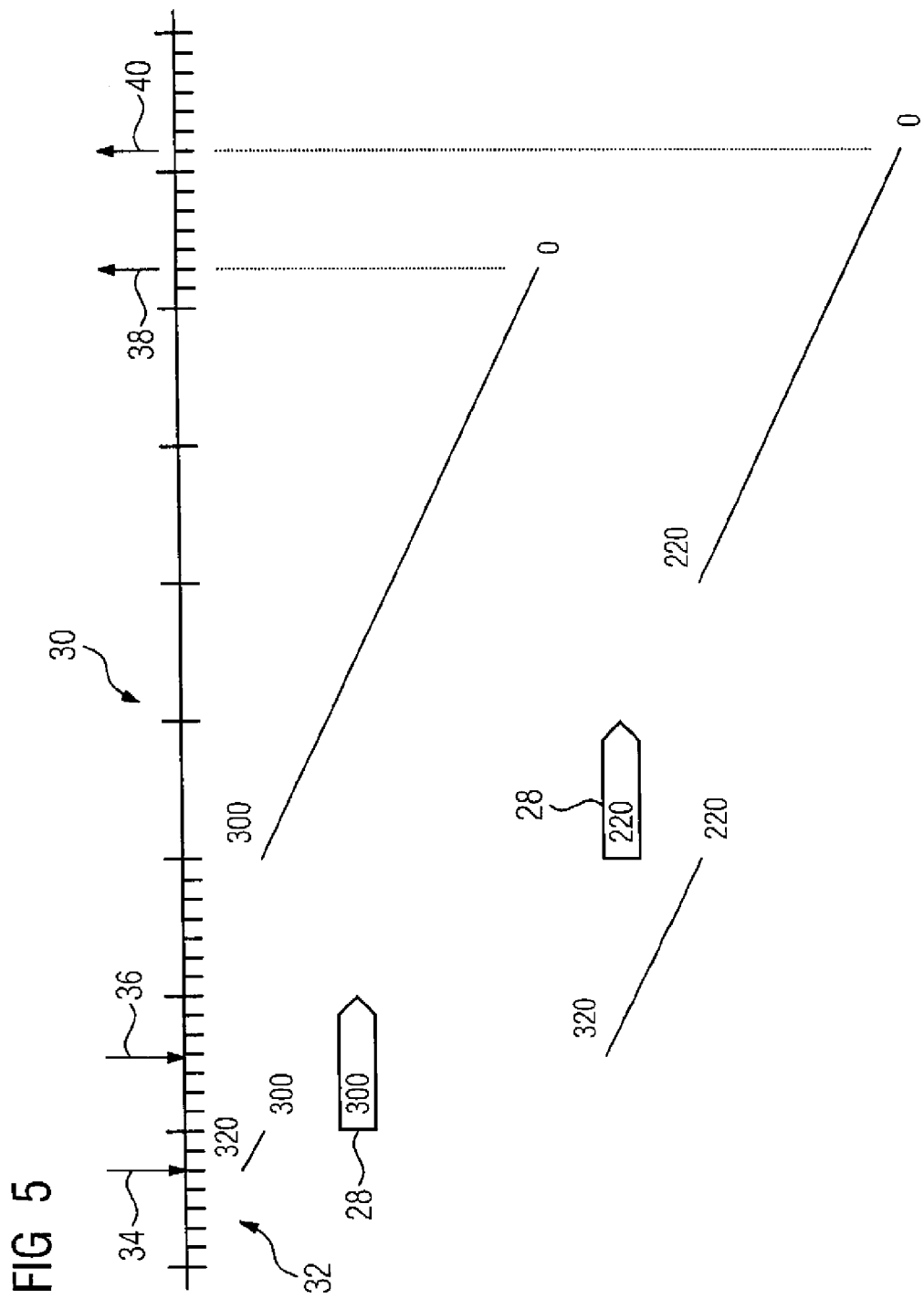
FIG. 5 shows a particular situation in which the method according to the present invention is used for transmitting a plurality of signals.

FIG. 5 shows a an approach in accordance with the invention, namely the transmission of a plurality of, in particular uncorrelated (synchronous) signals—first and second signal 34, 36. On entry of each signal 34, 36 a separate counter is started (start value "320" in each case) and thus—as before—the offset between the point in time of the arrival of the signal 34, 36 and the next communication clock cycle is unlatched. The offset determined for the entry of the first signal 34 (numerical value "300") is transmitted with a telegram 28 to the receiver. With the receipt of the telegram 28 on the receiver side a first counter is initialized with the received count ("300") and the timer starts to decrement until the timer finally times out and a first output signal 38 is generated for the first synchronous signal 34. The second synchronous signal 36 arriving in the interim is handled in just the same way: A second counter is initialized ("320") and decremented with the device clock pulse until a communication clock cycle 30 is reached in relation to the second synchronous signal 36, with which a new telegram 28 can be sent. The second counter has run down in the example shown to the counter value "220" and this count is transmitted to the receiver with a telegram 28. A second counter is initialized with this count and when the second counter has timed out, a second output signal 40 is generated with regard to the second synchronization signal 40 is generated. It is important for the timing gap between the first and the second output signal 38, 40 to correspond to the timing gap between the first and second synchronous signal 34, 36. The timing relationship of the arrival of a plurality of (synchronous) signals 34, 36 is thus maintained, even when a separate telegram 28 is sent for each signal 34, 36 to the receiver or each receiver and when after the sending of a first telegram 28, for sending a second telegram 28, there must first be a wait for the transmission of the first telegram 28.

In the situation shown in FIG. 5 it has been assumed that the value of the counter is chosen to be sufficiently large in relation to a majority of communication clock cycles 30, so that the counters in any event do not time out during a predetermined majority of communication clock cycles 30. The size of the counter makes it possible to take account of the transmission duration or one or more telegrams 28. The size of the counter can accordingly be suitably selected with respect to an expected signal occurrence.

Based on the situation assumed in FIG. 1, FIG. 6 shows two automation devices 16, 18 linked via a serial connection 20 for communication purposes, of which one receives a synchronous signal 24 which is to be notified to the other, so that the former functions in relation to the notification as sender (on left) and the latter as receiver (on the right). Each automation device 16, 18—i.e. sender and receiver—comprises a processing unit 42 by way of a microprocessor or the like. Stored or able to be stored in a memory 44 is a control program 46, comprising program code instructions for executing the method as described here and possibly also its embodiments. One or more counters 48 as typical means for determining a measure for an offset between the time of arrival of a (synchronous) signal and a communication clock cycle 30 to be used next for telegram transmission can be implemented in such cases in hardware or also in software, i.e. as a functionality of the control program 46.

To this end, in the lower half of the diagram in FIG. 6, the execution sequence of the control program 46 for the sender and the receiver respectively is shown in a schematically simplified flow diagram, where this involves the handling of the entry of a synchronous signal 24 and the generation of an output signal 26 relating thereto. With the arrival of a synchronous signal 24 a counter 48 is started in the sender (first function block 50). On the sender side a measure is then determined for an offset between the arrival of a synchronous signal 24 and the communication clock cycle 30, by the count being frozen or buffered at the next usable communication clock cycle (second function block 52). The count is then transmitted as the determined offset value to the receiver in a telegram 28 (third function block 54). On the receiver side, with the receipt of the telegram 28, the count thus received is accepted for initialization of a receiver-side counter 48 (fourth function block 56). The counter 48 is then continuously decremented (fifth function block 58) and when the counter 48 times out the output signal 26 is generated in relation to the synchronous signal 24 arriving at the sender (sixth function 60). The control program 46 is thus an example of a computer program with program code instructions for implementing the method described here, when the computer program is executed by an automation device 12-18 and its processing unit 42.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating an automation system with a plurality of automation devices controlling a technical process of the automation system and linked via a serial connection for communication, with at least one automation device operating as a sender and at least one automation device operating as a receiver, said sender and receiver operating with a common communication clock cycle, the method comprising the steps of:

the at least one sender receiving a synchronizing signal from the technical process and determining with a local counter of the at least one sender an offset value between the synchronizing signal and an occurrence of the communication clock cycle, wherein a clock cycle of the local counter is shorter than the common communication clock cycle, the at least one sender transmitting the determined offset value as a value of the local counter of the at least one sender in a telegram to the at least one receiver, the at least one receiver receiving the telegram with the offset value from the at least one sender and waiting, after the occurrence of the common communication clock cycle, until a local counter of the at least one receiver having a clock cycle identical to the clock cycle of the local counter of the at least one sender indicates that a time period has elapsed, wherein the time period is equal to the offset value, and the at least one receiver generating an output signal for controlling the technical process after the time period has elapsed.

2. The method of claim 1, wherein the offset value is a count of a sender counter started with the synchronizing signal or with the communication clock cycle.

3. The method of claim 2, wherein the count of the sender counter is selected to be sufficiently large in relation to a communication clock cycle so as to prevent the sender counter from timing out during a communication clock cycle.

4. The method of claim 2, wherein the sender counter started with the synchronizing signal is decremented or incremented at each occurrence of a device clock pulse.

5. The method of claim 1, wherein the at least one receiver loads a receiver counter with the determined offset value and generates the output signal when the receiver counter times out.

6. The method of claim 5, wherein the receiver counter of the at least one receiver is decremented at each occurrence of a device clock pulse.

7. The method of claim 1, wherein the at least one receiver starts a receiver counter at each communication clock cycle, compares a count of the receiver counter with the determined offset value and generates the output signal.

8. The method of claim 1, further comprising the steps of:

starting at the at least one sender a first sender counter with a first synchronizing signal and starting at the at least one sender a second sender counter operating with a second synchronizing signal device having an offset from the first synchronizing signal, wherein the first sender counter and the second sender counter operate at a common device clock pulse, stopping the first sender counter with a communication clock pulse at a first sender count when a first data transmission associated with the first synchronizing signal takes place, transmitting the first sender count to the at least one receiver in the first data transmission, initializing a first receiver counter at the at least one receiver with the transmitted first sender count and decrementing the first receiver counter, and generating a first output signal at the at least one receiver when the first receiver counter times out, stopping the second sender counter with the communication clock cycle at a second sender count when a second data transmission associated with the second synchronizing signal takes place, transmitting the second sender count to the at least one receiver in the second data transmission, initializing a second receiver counter at the at least one receiver with the transmitted second sender count and decrementing the second receiver counter, and generating a second output signal at the at least one receiver when the second receiver counter times out, wherein an offset between the generated first output signal and the second generated output signal is equal to the offset between the first synchronizing signal and the second synchronizing signal.

9. The method of claim 8, wherein the count of the first sender counter and the count of the second sender counter and the count of the first receiver counter and the count of the second receiver counter are selected to be sufficiently large in relation to the communication clock cycle so that the first and second sender and receiver counters do not time out during a predetermined plurality of communication clock cycles.

10. A computer program having program code instructions stored on a non-transitory computer-readable medium, wherein the program code instructions, when loaded into a memory of a processing unit of an automation device having a plurality of automation devices controlling a technical process of the automation system and linked for communication purposes via a serial connection, of which at least one automation device functions as sender and at least one automation device functions as a receiver, said sender and receiver operating with a common communication clock cycle, and executed by the processing unit, cause the automation system to:

receive at the at least one sender a synchronizing signal from the technical process and determine with a local counter of the at least one sender an offset value between the synchronizing signal and an occurrence of the communication clock cycle, wherein a clock cycle of the local counter is shorter than the common communication clock cycle, transmit the determined offset value as a value of the local counter of the at least one sender in a telegram from the at least one sender to the at least one receiver, receive at the at least one receiver the telegram with the offset value from the at least one sender and wait, after the occurrence of the common communication clock cycle, until a local counter of the at least one receiver having a clock cycle identical to the clock cycle of the local counter of the at least one sender indicates that a time period has elapsed, wherein the time period is equal to the offset value, and generate at the at least one receiver an output signal for controlling the technical process after the time period has elapsed.

11. A non-transitory computer-readable storage medium comprising program code instructions stored on a non-transitory computer readable medium, wherein the program code instructions, when loaded into a memory of a processing unit of an automation device having a plurality of automation devices controlling a technical process of the automation system and linked for communication purposes via a serial connection, of which at least one automation device functions as sender and at least one automation device functions as a receiver, said sender and receiver operating with a common communication clock cycle, and executed by the processing unit, cause the automation system to:

receive at the at least one sender a synchronizing signal from the technical process and determine with a local counter of the at least one sender an offset value between the synchronizing signal and an occurrence of the communication clock cycle, wherein a clock cycle of the local counter is shorter than the common communication clock cycle, transmit the determined offset value as a value of the local counter of the at least one sender in a telegram from the at least one sender to the at least one receiver, receive at the at least one receiver the telegram with the offset value from the at least one sender and wait, after the occurrence of the common communication clock cycle, until a local counter of the at least one receiver having a clock cycle identical to the clock cycle of the local counter of the at least one sender indicates that a time period has elapsed, wherein the time period is equal to the offset value, and generate at the at least one receiver an output signal for controlling the technical process after the time period has elapsed.

12. An automation device with a plurality of automation devices controlling a technical process of the automation system and linked for communication purposes via a serial connection, of which at least one automation device functions as sender and at least one automation device functions as a receiver, said sender and receiver operating with a common communication clock cycle, the automation device comprising a processing unit and a memory, with a computer program having program code instructions being loaded into the memory from a non-transitory medium and executed by the processing unit, wherein the automation system is configured to:

receive at the at least one sender a synchronizing signal from the technical process and determine with a local counter of the at least one sender an offset value between the synchronizing signal and an occurrence of the communication clock cycle, wherein a clock cycle of the local counter is shorter than the common communication clock cycle, transmit the determined offset value as a value of the local counter of the at least one sender in a telegram from the at least one sender to the at least one receiver, receive at the at least one receiver the telegram with the offset value from the at least one sender and wait, after the occurrence of the common communication clock cycle, until a local counter of the at least one receiver having a clock cycle identical to the clock cycle of the local counter of the at least one sender indicates that a time period has elapsed, wherein the time period is equal to the offset value, and generate at the at least one receiver an output signal for controlling the technical process after the time period has elapsed.

* * * * *